United States Patent [19]

Wong et al.

[11] Patent Number: 4,609,252

[45] Date of Patent: Sep. 2, 1986

[54] ORGANIC OPTICAL WAVEGUIDE DEVICE AND METHOD OF MAKING

[75] Inventors: Shi-Yin Wong, Santa Monica; Gregory L. Tangonan, Oxnard, both of Calif.

[73] Assignee: Hughes Aircraft Company, Los Angeles, Calif.

[21] Appl. No.: 579,791

[22] Filed: Feb. 15, 1984

Related U.S. Application Data

[63] Continuation of Ser. No. 25,709, Apr. 2, 1979, abandoned.

[51] Int. Cl.[4] ............................................. G02B 6/10
[52] U.S. Cl. .................................. 350/96.12; 350/1.1; 350/96.15; 350/96.34; 427/162; 430/321
[58] Field of Search .................. 350/1.1, 96.12, 96.15, 350/96.34, 311; 427/41, 43.1, 54.1, 160, 162, 163, 384; 430/321; 252/300 UO, 600, 589

[56] References Cited

U.S. PATENT DOCUMENTS

| | | | |
|---|---|---|---|
| 3,740,224 | 6/1973 | Barzynski et al. | 430/281 |
| 3,809,732 | 5/1974 | Chandross et al. | 430/321 |
| 3,822,928 | 7/1974 | Smolinsky et al. | 350/96.12 |
| 3,838,905 | 10/1974 | Irie | 350/96.12 X |
| 3,839,067 | 10/1974 | Sosnowski et al. | 350/96.12 X |
| 3,914,462 | 10/1975 | Morishita et al. | 427/43.1 X |
| 3,953,620 | 4/1976 | Chandross et al. | 350/96.12 X |
| 3,987,215 | 10/1976 | Cortellino | 427/43.1 X |
| 4,017,652 | 4/1977 | Gruber | 427/54.1 |
| 4,116,530 | 9/1978 | Bellavance et al. | 350/96.12 |
| 4,142,877 | 3/1979 | Auracher et al. | 350/96.15 X |
| 4,188,451 | 2/1980 | Humphrey, Jr. | 427/163 X |
| 4,201,808 | 5/1980 | Cully et al. | 427/54.1 X |
| 4,207,156 | 6/1980 | Collins et al. | 427/54.1 X |
| 4,212,901 | 7/1980 | van Neerbos et al. | 427/54.1 X |
| 4,216,267 | 8/1980 | Lorenz et al. | 427/54.1 X |

FOREIGN PATENT DOCUMENTS

| | | |
|---|---|---|
| 1394747 | 5/1975 | United Kingdom ............ 350/96.12 |
| 2045966 | 5/1983 | United Kingdom . |

OTHER PUBLICATIONS

Ramaswamy et al, "Low-Loss Polymer Films with Adjustable Refractive Index", *Appl. Optics,* vol. 12, No. 7, Jul. 1973, pp. 1581-1583.

Maher et al, "Photoinduced Cross Linking to Fabricate Optical Waveguides", *Xerox Discl. Journ.,* vol. 1, No. 5, May 1976, p. 17.

Tomlinson et al, "Photoinduced Refractive Index Increase...", *Appl. Phys. Lett.,* vol. 16, No. 12, Jun. 1970, pp. 486-489.

Auracher et al, "Planar Branching Networks for ...", *Integrated Optics*—Tech. Papers presented @ Tp. Mtg. on. Int. Opt., Jan. 1976, Salt L. City.

Kobayashi et al, "Micro-Optics Devices for ...", 1977 *Intl. Conf. on Int. Opt. & Opt. Fiber Commun.,* Jul. 1977, Tokyo, pp. 367-370.

Kosar, "Photopolymerization Processes", *Light-Sensitive Systems,* Chap. 5, pp. 158-193, John Wiley & Sons, New York.

*Primary Examiner*—William L. Sikes
*Assistant Examiner*—Frank González
*Attorney, Agent, or Firm*—Mary E. Lachman; A. W. Karambelas

[57] ABSTRACT

The specification describes a process for forming an organic optical waveguide device of predetermined planar geometry. First a layer of an organic photoactive composition (for example, phenylglyoxylic acid or a derivative thereof) is deposited to a predetermined thickness on a given substrate. The photoactive composition is characterized by being capable of forming a waveguiding material upon polymerization. Next, the deposited photoactive layer is exposed to a beam of ultraviolet radiation through a mask which defines the desired planar geometry for the device to be formed. Finally, the exposed photoactive layer is developed to leave behind a portion of the photoactive material which has the desired planar geometry and which is an organic waveguiding material.

6 Claims, 4 Drawing Figures

ORGANIC OPTICAL WAVEGUIDE DEVICE AND METHOD OF MAKING

This application is a continuation of application Ser. No. 25,709, filed Apr. 2, 1979, now abandoned.

FIELD OF THE INVENTION

This invention relates generally to organic optical waveguide devices and to the process for forming them and more particularly to such devices having predetermined planar geometry.

BACKGROUND OF THE INVENTION

In optical communication systems, messages are transmitted by carrier waves of optical frequencies that are generated by sources such as lasers or light-emitting diodes. There is much current interest in such optical communication systems because they offer several advantages over conventional communication systems, such as a greatly increased number of channels of communication and the ability to use other materials besides expensive copper cables for transmitting messages. One such means for conducting or guiding waves of optical frequencies from one point to another is called an "optical waveguide." The operation of an optical waveguide is based on the fact that when a medium which is transparent to light is surrounded or otherwise bounded by another medium having a lower refractive index, light introduced along the inner medium's axis is highly reflected at the boundary with the surrounding medium, thus producing a guiding effect. The most frequently used material for such a waveguide device is glass, which is formed into a fiber of specified dimensions.

As the development of optical circuits proceeded, it became necessary to have structures which could couple, divide, switch and modulate the optical waves from one waveguide device to another. A device of particular interest is the "Y-coupler", which is a "y" shaped device that couples signals together or divides them apart. One method used to form such a coupler is to fuse or melt two fibers together so that light from one fiber can pass to the connected fibers. However, in such a fusion process it is difficult to control the extent of fusion and the exact geometry and reproduciability of the final structure.

Another method used to form an optical coupling device involves the application of standard photolithographic processes and diffusion. By this prior art process, standard lithographic processes are used to define a pattern in a photoresist layer deposited on a chosen substrate. Then, an etchant is applied to etch the photoresist-defined pattern into the substrate. Next, a metal is deposited in the etched region by vacuum deposition. The photoresist pattern is then lifted off with an appropriate solvent, carrying with it unwanted metal deposits. The structure is then heated to diffuse the metal deposited in the etched region into the substrate, to form a waveguiding layer therein. In addition to the fact that many steps are involved in such a process, there is also a limitation on the thickness of the metal which may be deposited. First, since vacuum deposition is a relatively slow process, there is the limitation of the excessive amount of time required to deposit a thick layer of metal. Secondly, as more and more metal is depositied, new centers for deposition are created, resulting in an uneven deposit.

Another approach to coupling and branching has been taken by K. Kobayashi, R. Ishikawa, K. Minemura, and S. Sugimoto as reported in a publication entitled "Micro-Optics Devices for Branching, Coupling, Multiplexing, and Demultiplexing," in the *Technical Digest of the* 1977 *International Conference on Integrated Optics and Optical Fiber Communication,* July 18-20, 1977, Tokoyo, Japan. Kobayashi et al use light focusing rod lenses, or light guides with a parabolic refractive index distribution, to obtain branching, coupling, multiplexing, and demultiplexing. Such lenses must, however, be cut and polished to specification, which are costly processes. In addition, these lenses are designed for and function only at a specific wavelength and thus have limited applicability.

Still another approach to branching structures has been reported by F. Auracher, H. Boroffka, and R. Th. Kersten in an article entitled "Planar Branching Networks for Multimode and Monomode Glass Fiber Systems", *Integrated Optics,* a digest of technical papers presented at the topical meeting on Integrated Optics, Jan. 12-14, 1976, Salt Lake City, Utah. Auracher et al coated a quartz substrate with thin sheets of a commercially available light-sensitive material (specifically, Dupont's "Riston" /2/) and laminated these sheets to form a layer approximately 100 micrometers thick. Then, by standard photolithographic processes, a pattern was developed in the light-sensitive material. However, as Auracher et al discuss, the performance of the branching structure so formed was poor. Optical losses as well as the aging resistance of the exposed material were unsatisfactory.

SUMMARY OF THE INVENTION

The general purpose of this invention is to provide new and improved organic optical waveguide structures having predetermined planar geometry and to provide the process for forming these structures, which possess most, if not all, of the advantages of the prior art devices and processes while alleviating their significant disadvantages discussed above.

In order to accomplish the above-described general purpose of this invention, we have discovered and developed a new and improved process for forming an organic optical waveguide device of predetermined planar geometry by first depositing a layer of an organic photoactive composition to a predetermined thickness on a given substrate. The photoactive composition is characterized by being capable of forming a waveguiding material upon polymerization. Next, the deposited photoactive layer is exposed to a beam of ultraviolet radiation through a mask which defines the desired planar geometry for the device to be formed. Finally, the exposed photoactive layer is developed to leave behind a portion of the photoactive material which has the desired planar geometry and which is an organic waveguiding material.

Accordingly, it is an object of the present invention to provide a new and improved planar process for forming an organic optical waveguide device.

Another object is to provide a process of the type described in which the organic optical waveguide device has a predetermined planar geometry.

Still another object is to provide a process of the type described which uses known lithographic procedures and is thus highly reproducible.

Another object is to provide a process of the type described which is relatively straightforward and inexpensive.

Yet another object is to provide a process of the type described which allows versatility in the design of the geometry of the device formed.

A further object of the present invention is to provide a new and improved organic optical waveguide device having a predetermined planar geometry.

Another object is to provide a device of the type described which has a "Y" configuration and functions as an optical coupler.

Yet another object is to provide a device of the type described in which the chemical composition and thus the waveguiding properties of the device may be varied at will.

These and other objects and advantages of the present invention will become more readily apparent in the following description of the drawings and the preferred embodiment of the invention.

DETAILED DESCRIPTION OF THE INVENTION

Figure 1A:
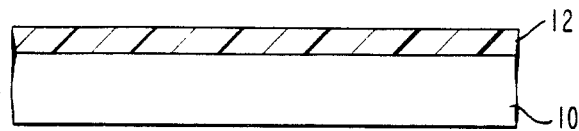
FIG. 1 illustrates, in schematic cross-section, some of the major steps in the process of the present invention.

FIG 1a shows a substrate 10 such as glass, fused quartz, or soda lime glass, upon which has been deposited a layer 12 of an organic photoactive composition which is capable of forming a waveguiding material upon polymerization. This photoactive composition comprises: (1) a plastic material such as polymethylmethacrylate or polyvinylacetate, which is transmissive to light waves in the visible and near infrared range (i.e., having a wavelength of 0.4 micrometers to 2.5 micrometers); (2) a photosensitizer such as phenylglyoxylic acid or its derivatives, which improves the absorption efficiency of the plastic material; and optionally, (3) a photopolymer such as Photozid (the reaction product of a maleic anhydride copolymer with a hydroxyl terminated arenesulfonyl oxide, obtained from The Upjohn Company, Kalamazoo, Mich.). The composition of this photoactive material can be varied to produce the desired waveguiding characteristics in the final device. In this manner, the device of the present invention can accommodate optical fibers having various refractive indices. The organic photoactive layer 12 is deposited by dipping the substrate 10 into a solution of the photoactive composition. The photoactive composition is deposited to a thickness of 60-100 micrometers in order to form a device which is compatible with conventional glass and plastic fibers which are typically 60-100 micrometers in diameter. The deposited photoactive composition may be removed from the back (or bottom) side of the substrate 10 as shown in FIG. 1a by washing that side with acetone. Optionally, the photoactive composition deposited on the back side of the substrate may be left in place.

Figure 1B:
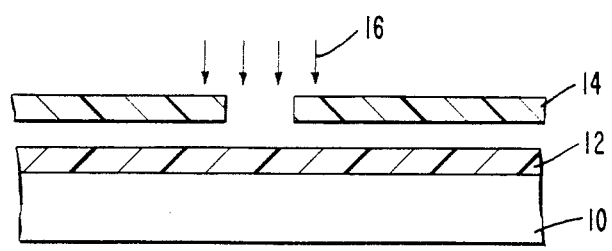
Figure 2:
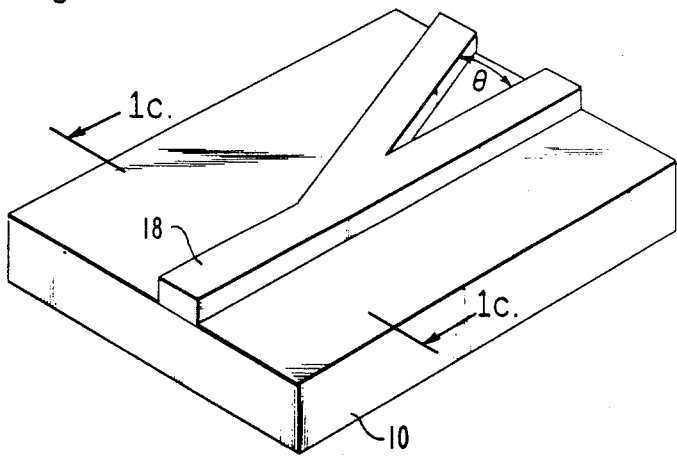
FIG. 2 illustrates, in schematic and isometric cross-section, the configuration of a preferred embodiment of the present invention.

Next, using known photolithographic techniques, as discussed, for example, by William S. DeForest in the book entitled "Photoresist Materials and Processes," McGraw-Hill Book Company, New York, 1975, the structure of FIG. 1a is exposed to a beam 16 of ultraviolet light, through an off-contact mask 14 which is placed a distance of from one to 10 micrometers from the substrate 10 and which defines the desired geometry of the final device as indicated in FIG. 1b, to cause the photoactive composition to polymerize into a waveguiding material. If a Y-configuration is the desired geometry, the mask 14 would have a Y shape formed therein. As viewed in FIG. 1b, only the bottom of the base of the Y is visible, but FIG. 2 shows a complete Y structure. Finally, the deposited photoactive layer is developed with an appropriate solvent to remove the undesired portion (i.e. the unpolymerized portion for a negative-acting resist or the depolymerized portion for a positive-acting resist). The pattern 18 of the exposed photoactive composition which remains deposited on the substrate 10 has the configuration which was defined by the mask 14.

The process of the present invention has the advantages of being a planar approach to forming waveguide devices, relatively straightforward, and inexpensive. The present invention uses a straightforward planar approach of forming an optical circuit on a planar surface, rather than the more complicated approach of bulk optics in which components such as lenses, filters, and splitters are used. In addition, the process of the present invention is relatively straightforward compared to prior art processes for forming optical devices by standard photolithographic processes as previously discussed in that it requires only 3 steps: (1) deposition of the photoresist; (2) formation of the pattern; and (3) development of the exposed photoresist. Further, because standard photolithographic processes which are highly reproducible are used, the process of the present invention is likewise highly reproducible. Also the present invention is highly versatile in the design of the desired planar geometry since any pattern which can be drawn can be formed. Furthermore, the thickness of the device which is formed can be controlled by controlling the thickness of the layer of the photoactive composition which is deposited. Thus, the process of the present invention overcomes the limitation in thickness imposed by prior art processes in which the material used to form the waveguiding layer is deposited under vacuum, as previously discussed. In addition, the process of the present invention avoids the use of a costly and time-consuming vacuum deposition process. Furthermore, the present invention produces a more effective device than the structures of Auracher et al because of the characteristics of the material used to form the waveguide structure. Auracher et al use a material which is not transmissive to light, which in turn causes the absorption of the light waves it is desired to transmit. The process of the present invention forms the waveguiding structure from a material which is transmissive to light waves in the visible and near infrared range, leading to efficient transmission of these light waves.

Figure 1C:
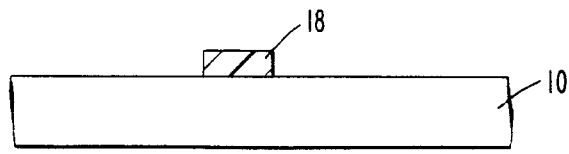

FIG. 2 shows a preferred embodiment of the present invention in which the predetermined planar geometry transmission path of the device is in the form of the letter "Y". The substrate 10 has deposited thereon the waveguiding pattern 18 which was formed in a manner similar to that described in FIG. 1, using a Y-shaped mask for mask 14 of FIG. 1b. The angle θ shown in FIG. 2 is the angle at which the incident light is split by the Y-shaped coupler shown. The device shown in FIG. 2 finds utility as a waveguide coupler, and the formation of such a device is described further in the following example.

EXAMPLE

This example illustrates the formation of a Y-shaped organic optical waveguide structure in accordance with the present invention. Following the procedure described in FIG. 1, a glass substrate was coated by dipping the substrate in a solution of a photoactive composition comprising: 1 part by weight of polymethylmethacrylate, 1 part by weight of Photozid (previously defined), and 0.1 part by weight of phenylglyoxylic acid (or its derivatives) in acetone. The layer of photoactive composition deposited was 100 micrometers thick. The layer of photoactive composition deposited on the back side of the substrate was removed by washing the back side of the substrate with acetone. Next, the deposited layer was exposed through an off-contact mask defining a Y-configuration to a beam of ultraviolet light for 1 minute to cause polymerization to occur. Then the deposited layer was developed with acetone to remove the unexposed area and to leave a Y-shaped structure as shown in FIG. 2. When the structure thus formed and having an angle $\theta$ of 5 degrees was exposed to light, a 10:1 splitting of the light by the structure was observed.

While the present invention has been particularly described with respect to a preferred sequence of process steps to form an organic optical waveguide device, it will be understood that the invention is not limited to the particular process steps, their sequence, or the final structures depicted in the drawings. On the contrary, it is intended to cover all alternatives, modifications, and equivalents as may be included within the spirit and scope of the invention defined by the appended claims. In particular, the scope of the invention is intended to include waveguide devices having various geometries other than the "Y" shape specifically discussed. In addition, it is intended to include a device having multiple geometric shapes defined thereon, such as to form a planar star coupler or other device consisting of multiple expansion and collection horns.

What is claimed is:

1. A waveguide structure comprising a substrate and a waveguide strip thereon including a polymerized photoactive composition containing a plastic material which is transmissive to light waves in the visible and near infrared range, a phenylglyoxylic acid or derivative thereof, and a photopolymer.

2. A waveguide structure comprising a substrate and a waveguide strip thereon including a polymerized photoactive composition deposited to a thickness of 100 micrometers or less and containing:
    (a) a plastic material chosen from the group consisting of polymethylmethacrylate and polyvinylacetate and comprising one part by weight of said composition;
    (b) Photozid photopolymer, comprising one part by weight of said composition; and
    (c) a phenylglyoxylic acid or phenylglyoxylic acid derivative, comprising 0.1 part by weight of said composition.

3. An organic optical waveguide device of predetermined planar geometry formed by:
    (a) providing a substrate;
    (b) depositing a layer of an organic photoactive composition to a predetermined thickness on said substrate, said photoactive composition being capable of forming a waveguiding material upon polymerization and comprising a plastic material which is transmissive to light waves in the visible and near infrared range, and a phenylglyoxylic acid or a derivative thereof, said acid or derivative comprising approximately 0.1 part by weight of said photoactive composition;
    (c) exposing said deposited layer to a beam of ultraviolet radiation through a mask defining said predetermined planar geometry; and
    (d) developing said deposited layer after said exposing to leave behind a portion of said deposited layer which has said predetermined planar geometry and which is an organic optical waveguiding material.

4. A device as set forth in claim 3 wherein said photoactive composition contains a material selected from the group consisting of polymethylmethacrylate and polyvinylacetate and is deposited to a thickness of approximately 100 micrometers.

5. A device as set forth in claim 3 wherein said predetermined planar geometry is in the form of the letter "Y" and said device functions as an optical coupler.

6. A process for forming an organic optical waveguide device of predetermined planar geometry comprising the steps of:
    (a) providing a substrate;
    (b) depositing a layer of an organic photoactive composition to a predetermined thickness on said substrate, said photoactive composition being capable of forming a waveguiding material upon polymerization and comprising
        a plastic material chosen from the group consisting of polymethylmethacylate and polyvinylacetate and comprising one part by weight of said composition,
        a phenylglyoxylic acid or a derivative thereof, said acid or derivative comprising approximately 0.1 part by weight of said photoactive composition, and
        a photopolymer comprising Photozid and comprising one part by weight of said composition;
    (c) exposing said deposited layer to a beam of ultraviolet radiation through a mask defining said predetermined planar geometry; and
    (d) developing said deposited layer after said exposing to leave behind a portion of said deposited layer which has said predetermined planar geometry and which is an organic optical waveguiding material.

* * * * *